(12) United States Patent
Janssen et al.

(10) Patent No.: US 7,891,164 B2
(45) Date of Patent: Feb. 22, 2011

(54) INLET AIRFLOW MANAGEMENT SYSTEM FOR A PULSE DETONATION ENGINE FOR SUPERSONIC APPLICATIONS

(75) Inventors: Jonathan Sebastian Janssen, Troy, NY (US); Venkat Eswarlu Tangirala, Niskayuna, NY (US); Anthony John Dean, Scotia, NY (US); James Fredric Wiedenhoefer, Glenville, NY (US)

(73) Assignee: General Electric Company, Niskayuna, NY (US)

( * ) Notice: Subject to any disclaimer, the term of this patent is extended or adjusted under 35 U.S.C. 154(b) by 976 days.

(21) Appl. No.: 11/554,824

(22) Filed: Oct. 31, 2006

(65) Prior Publication Data

US 2008/0098710 A1 May 1, 2008

(51) Int. Cl.
*F02C 5/12* (2006.01)
(52) U.S. Cl. .................. 60/39.39; 60/247; 60/39.38; 60/39.76
(58) Field of Classification Search .............. 60/247, 60/39.38, 39.76, 39.39
See application file for complete search history.

(56) References Cited

U.S. PATENT DOCUMENTS

| 5,345,758 | A | | 9/1994 | Bussing | |
|---|---|---|---|---|---|
| 5,513,489 | A | * | 5/1996 | Bussing | 60/39.38 |
| 6,062,018 | A | * | 5/2000 | Bussing | 60/39.39 |
| 6,505,462 | B2 | | 1/2003 | Meholic | |
| 6,637,187 | B2 | | 10/2003 | Sanders et al. | |
| 6,889,505 | B2 | * | 5/2005 | Butler et al. | 60/776 |
| 7,124,573 | B2 | * | 10/2006 | Venkataramani et al. | 60/247 |
| 7,228,683 | B2 | * | 6/2007 | Henry | 60/204 |
| 7,520,123 | B2 | * | 4/2009 | Saddoughi et al. | 60/247 |
| 2009/0120059 | A1 | * | 5/2009 | Sanders et al. | 60/247 |

OTHER PUBLICATIONS

V.E. Tangirala et al.; Performance Estimations of a Pulse Detonation Engine with Exit Nozzle; Jul. 2006; 42nd AIAA/ASME/SAE/ASEE; Sacramento, CA.
V.E. Tangirala et al,; Unsteady Flow Considerations for Performance Estimation of a Pulse Detonation Engine; 2005; ISABE.

* cited by examiner

*Primary Examiner*—Michael Cuff
*Assistant Examiner*—Young Choi
(74) *Attorney, Agent, or Firm*—Richard A. DeCristofaro (57) ABSTRACT

A pulse detonation engine contains a mechanically driven timing device coupled with a stator device, where the timing device has both an opening portion and a blocking portion. The opening and blocking portions open and close air flow access to a detonation chamber of the pulse detonation engine at appropriate times during the pulse detonation cycle.

33 Claims, 9 Drawing Sheets

INLET AIRFLOW MANAGEMENT SYSTEM FOR A PULSE DETONATION ENGINE FOR SUPERSONIC APPLICATIONS

BACKGROUND OF THE INVENTION

This invention relates to pulse detonation systems, and more particularly, to an inlet airflow management system for use on a pulse detonation engine for supersonic applications.

With the recent development of pulse detonation combustors (PDCs) and engines (PDEs), various efforts have been underway to use PDC/Es in practical applications, such as combustors for aircraft engines. Just as with any normal air breathing engine, inlet stability is an important aspect of maintaining proper operation of a pulse detonation engine. This is particularly true in applications with multiple combustors with a common inlet, where it is important to minimize or eliminate disruptions to the inlet. Such disruptions include pressure fluctuations, which have the potential to "un-start" or stall the airflow through the inlet, compressor, or other upstream devices.

These problems are particularly prevalent in pulse detonation engines which use open inlet tubes. During operation, PDE's create a high pressure detonation wave used for propulsion (as it exits the PDE). However, it has also been observed that a forward propagating pressure wave, which may contain fuel-air reaction products, is generated. Because the pulse detonation process is a high pressure rise process, these forward propagating pressure waves may provide enough perturbation to "un-start" the PDE inlet, as well as expose some of the upstream components to high pressure pulses, which could cause damage to these components.

Thus, it is desirable to provide some means or methodology to block these forward propagating pressure waves. Some efforts have been made to accomplish this by using conventional air flow valves. However, because of the operational pressures and frequencies involved (which can be as high as 100 Hz), such devices have had limited or no success.

Therefore, there exists a need to block any upstream pressure waves generated by a detonation, using a relatively simple and robust system. It is noted that although the expression "pulse detonation engine" is used herein, this term is intended to describe all combustion type devices employing pulse detonation technology, including but not limited to pulse detonation combustors, and the like.

SUMMARY OF THE INVENTION

In an embodiment of the invention, a pulse detonation engine (PDE) comprises a mechanically driven timing rotor in a cone or device configuration. The cone (or device) configuration is designed with a specially designed slot or slots, and blockages to open and close the pulse detonation engine at the appropriate times during the pulse detonation cycle.

At the upstream most portion of the pulse detonation engine (upstream of the detonation chamber), a valve timing device is made rotatable around a central axis. The device contains a blocking portion and a slot portion, and as the device is rotated the detonation chamber of the PDE is either closed or opened to the upstream portions of the system. The device may be coupled to a sprocket or sprocket coupled to a drive motor or device, or may be directly driven by the motor, to provide the necessary rotation. The rotational speed of the timing device can be adjustable to coincide with operational changes in the PDE.

At the forward end of the PDE the valve timing device is mated with a stationary slotted geometry herein referred to as a stator device, which is open to detonation chamber of the PDE. The configuration and mating of the valve timing and stator devices are such that as the valve timing device is rotated the detonation chamber is opened and closed to the upstream portions of the system.

The present invention also contains an embodiment where a plurality of pulse detonation engines are coupled to each other and the valve timing devices of each respective PDE are rotated together or separately.

A further embodiment of the present invention, is one where a plurality of pulse detonation engines are coupled to each other and a single valve timing device rotates along the centerline of the plurality of PDEs.

This invention is not limited to the configuration of one or a plurality of PDEs connected to a single timing device. Alternatively, a single timing device may be connected to each PDE and rotated together or separately.

As used herein, a "pulse detonation combustor" PDC (also including PDEs) is understood to mean any device or system that produces both a pressure rise and velocity increase from a series of repeating detonations or quasi-detonations within the device. A "quasi-detonation" is a supersonic turbulent combustion process that produces a pressure rise and velocity increase higher than the pressure rise and velocity increase produced by a deflagration wave. Embodiments of PDCs (and PDEs) include a means of igniting a fuel/oxidizer mixture, for example a fuel/air mixture, and a detonation chamber, in which pressure wave fronts initiated by the ignition process coalesce to produce a detonation wave. Each detonation or quasi-detonation is initiated either by external ignition, such as spark discharge or laser pulse, or by gas dynamic processes, such as shock focusing, auto ignition or by another detonation (i.e. cross-fire).

BRIEF DESCRIPTION OF THE DRAWINGS

The advantages, nature and various additional features of the invention will appear more fully upon consideration of the illustrative embodiment of the invention which is schematically set forth in the figures, in which.

DETAILED DESCRIPTION OF THE INVENTION

The present invention will be explained in further detail by making reference to the accompanying drawings, which do not limit the scope of the invention in any way.

As used herein, the term "air" is to include any all oxidizers, including but not limited to air, that can be used as a fuel oxidizer.

Figure 1:
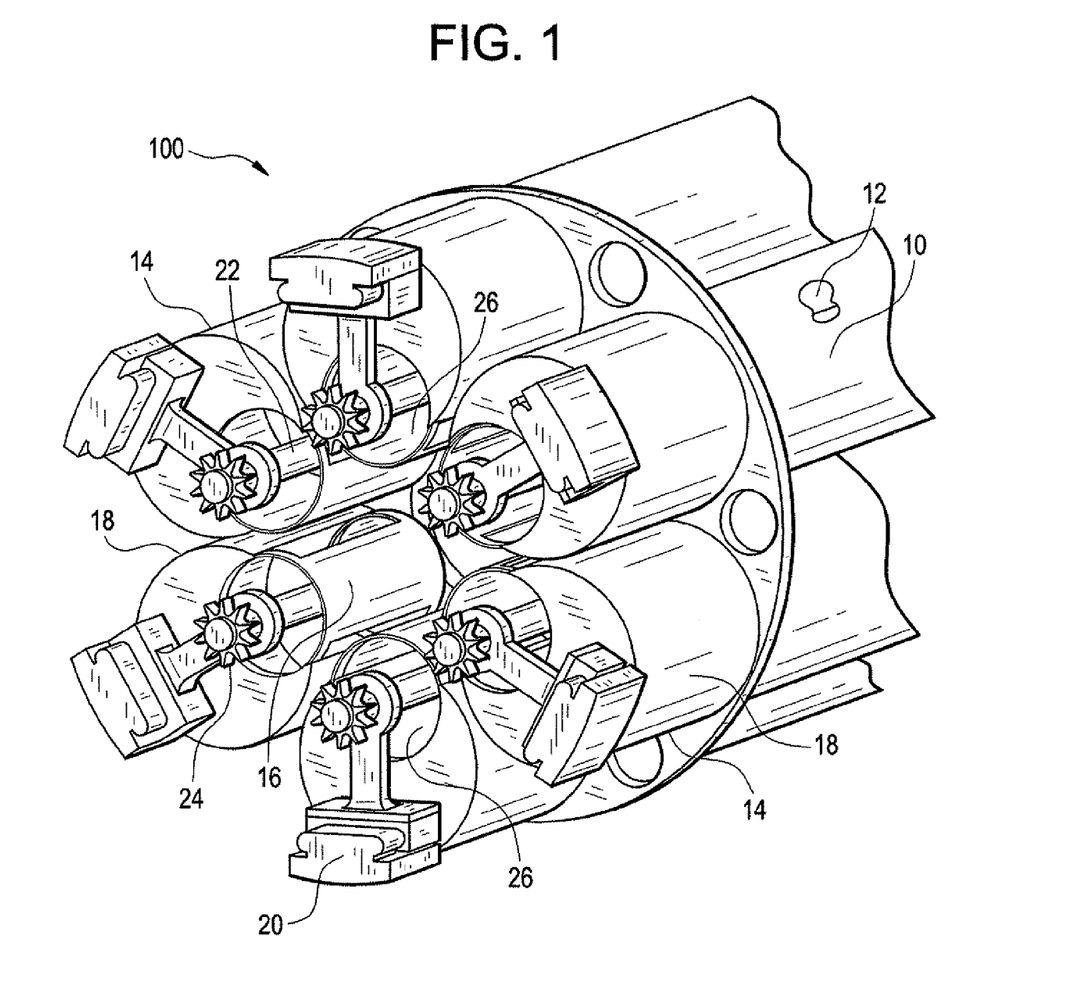
FIG. 1 shows a diagrammatical representation of a plurality of pulse detonation engines and a valve control device in accordance with an embodiment of the present invention.

FIG. 1 depicts an assembly 100 of a plurality of pulse detonation engines 10 in accordance with the present invention. Each of the engines 10 have a detonation chamber 12 which is downstream of the inlet portion 14 of the engine 10. The inlet portion 14 of each of the engines 10 contains a valve timing device 16, a stator device 18, and a mounting bracket 20. Further, each of the valve timing devices 16 contain a shaft 22 and a sprocket 24.

Each of the stator devices 18 contain an open portion 26 which allows air flow to enter the stator devices 18 and valve timing devices 16 during operation. Although not shown, it is contemplated that the assembly 100, shown in FIG. 1, is positioned downstream of a compressor in a typical gas turbine engine configuration. Further, the upstream portion of the assembly 100 is coupled to an air flow manifold structure which provides air flow to the pulse detonation engines 10. It is contemplated that each pulse detonation engine 10 is coupled to the compressor stage (not shown) through a separate manifold structure, or that all engines 10 share a common supply manifold.

Each of the valve timing devices 16 are rotated via the shaft 22 which has a sprocket 24 on and end thereof. Further, as shown in FIG. 1, shafts 22 are supported by mounting brackets 20. The present invention is not limited, in any way, with regard to the structure or configuration of the mounting brackets 20 depicted in FIG. 1. The mounting brackets 20 are to be secured to the engine structure by any known conventional means.

Figure 2:
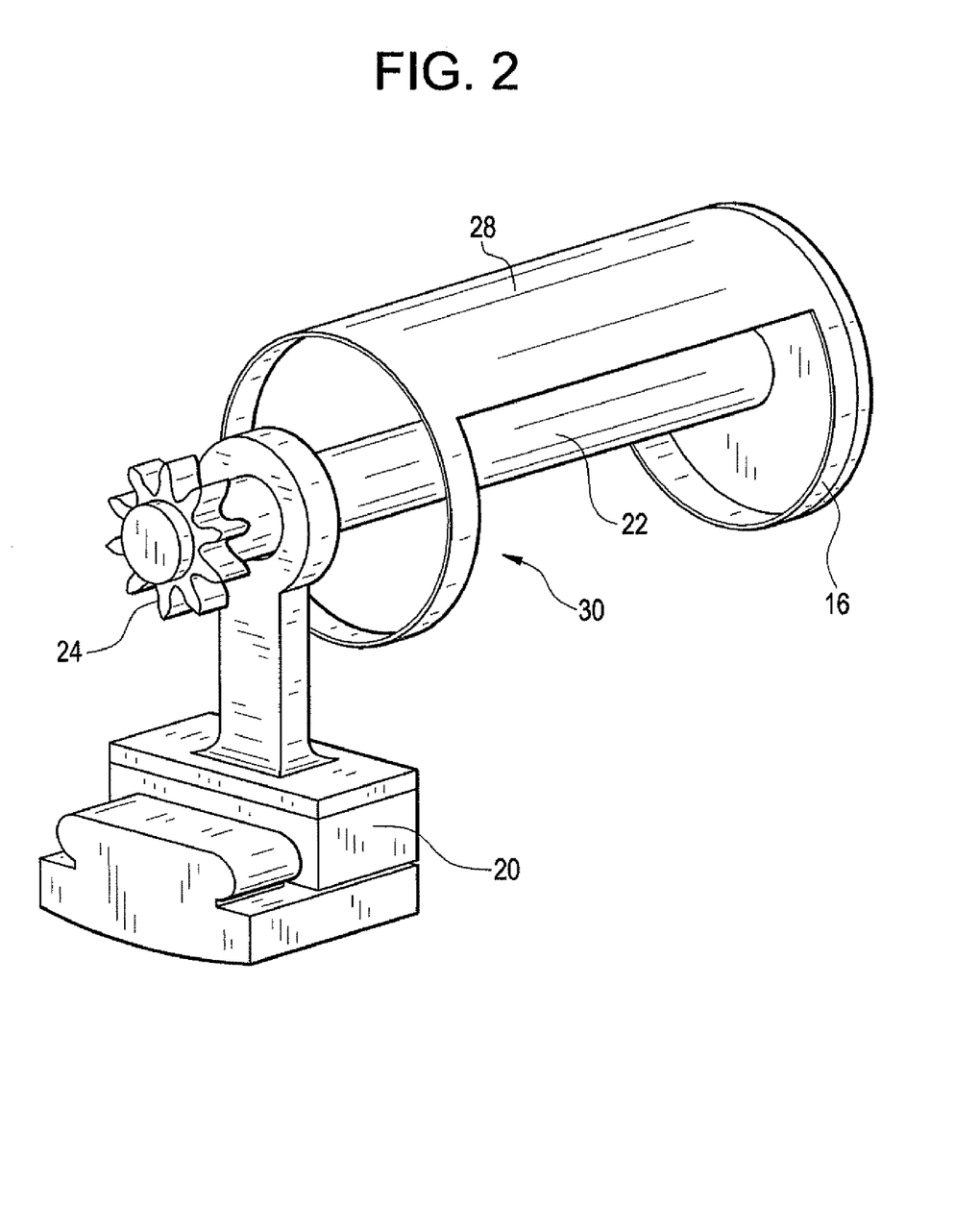
FIG. 2 shows a diagrammatical representation of a valve timing device in accordance with the embodiment of the present invention shown in FIG. 1.

FIG. 2 shows a valve timing device 16 in accordance with an embodiment of the present invention. The timing device 16 is coupled to a shaft 22 which is supported by the mounting bracket 20. At the end of the shaft 22 is a sprocket 24. In an exemplary embodiment of the present invention, the timing device contains a blocking portion 28 and a slot portion 30. During operation, as the timing device 16 is rotated by the shaft 22, the air flow from the compressor stage (not shown) enters the detonation chamber 12 when the slot portion 30 rotates to allow the air flow to enter the chamber 12. Air flow is then blocked by the blocking portion 28, when the blocking portion 28 rotates to block the air flow from entering the detonation chamber 12. Such an operation avoids the need for having complicated air flow control equipment to control air flow from the compressor stage (not shown). In fact, air flow from the compressor stage can be maintained constant, resulting in relatively minor pressure rises as the blocking portion 28 blocks air flow from entering the detonation chambers 12. These pressure rises are relatively small when compared to the pressure rises which may be experienced due to forward propagating pressure waves from the pulse detonation process.

Although the use of a sprocket 24 is shown with respect to the above embodiment, the present invention is not limited in this regard. It is contemplated that any known and conventional means to impart rotation or movement may be used.

Additionally, the present invention is not limited to having a single blocking portion 28 and slot portion 30 on the timing valve 16. Specifically, it is contemplated that the timing valve 16 may have more than one blocking portions 28 (for example two) which are separated from each other by slot portions. Such a configuration will increase the overall frequency of operation while keeping the rotation rate the same.

Moreover, although FIG. 2 (and the following FIG. 3) shows the openings to be essentially rectangular in shape, the present invention is not limited in this way. It is contemplated that the openings and/or blocking portion be tapered or angled (or have any other geometric shape) to optimize performance of the device. By tapering or angling the openings, the amount of air flow can be regulated or controlled depending on the desired characteristics and performance.

Figure 3:
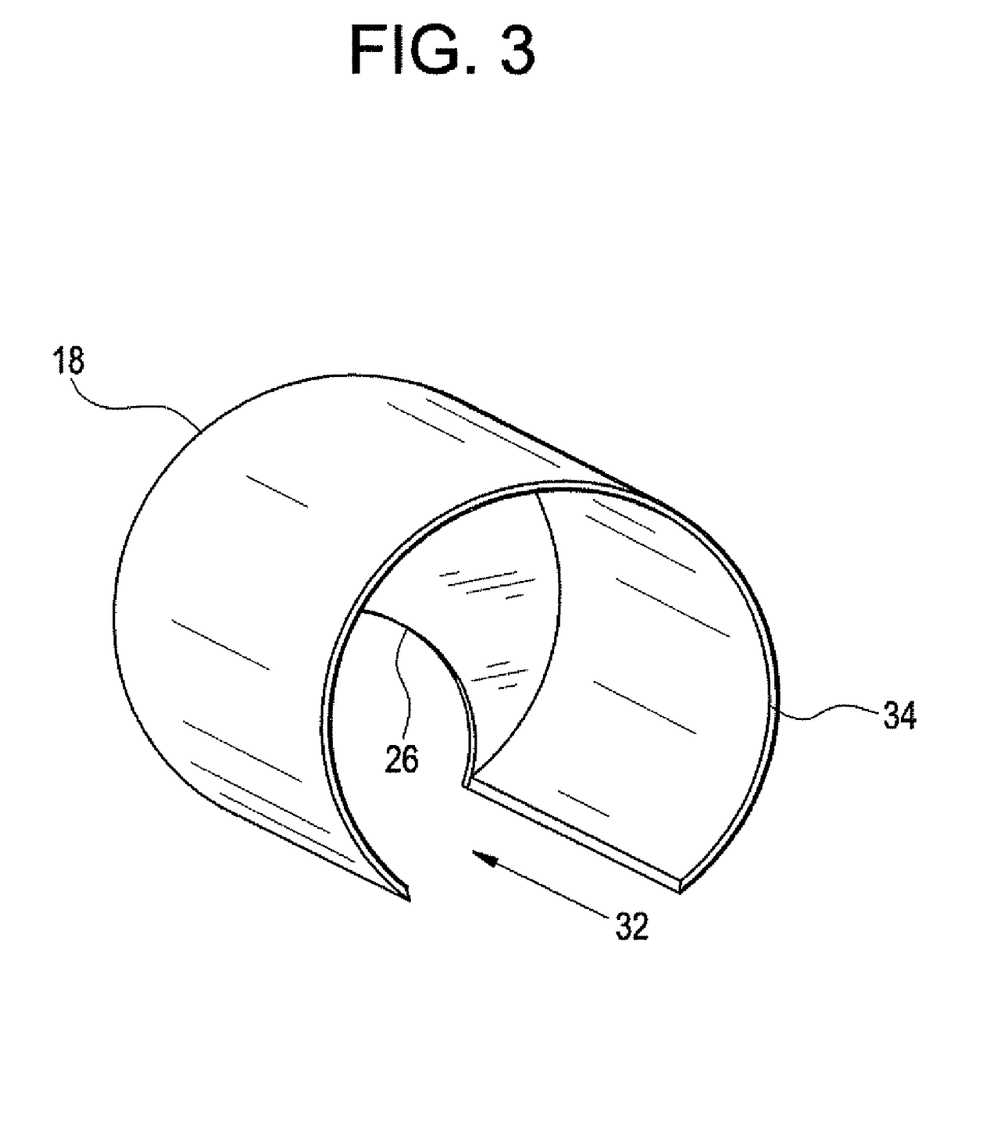
FIG. 3 shows a diagrammatical representation of a stator device in accordance with the embodiment of the present invention shown in FIG. 1.

FIG. 3 shows a stator device 18 in accordance with an embodiment of the present invention. The forward most end of the stator device has an open portion 26 which allows air flow to enter the volume of the timing device 16 and stator device 18. The size and shape of the open portion 26 is to control the amount of air flow to ensure the desired performance and operation. Further, the open portion 26 is to be of a sufficient size to allow the shaft 22 to pass through. The stator device 18 also has a wall portion 34 and a slot portion 32. During operation, the air flow passes through the slot portion 32 into the detonation chamber 12. In the assembly of the present invention, the timing device 16 rotates partially within the stator device 18. In an alternative embodiment of the present invention, this may be reversed.

Figure 4:
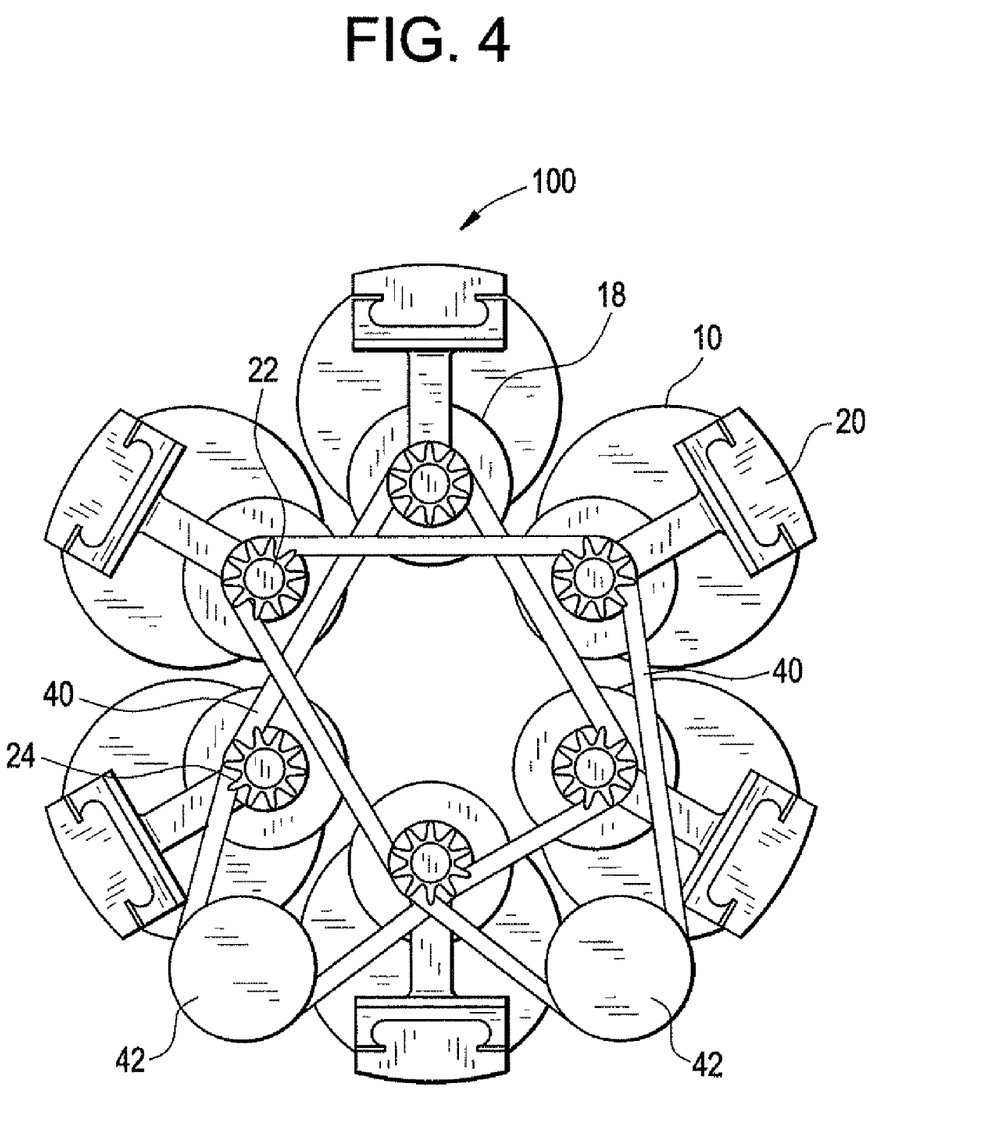
FIG. 4 shows a diagrammatical representation of a timing method used for the embodiment of the present invention shown in FIG. 1.

FIG. 4 shows an embodiment of a valve timing mechanism for the inlet air management system of the present invention. The view in this figure is the forward most end view of the assembly 100. Further, although six pulse detonation engines 10 are shown, the present invention is not limited to this number, and although they are shown in a symmetrical circular patter, again the present invention is not limited to this, as the engines 10 can be distributed in any pattern or configuration.

In FIG. 4, the sprockets 24 are engaged with a belts 40, where the belts are driven by motors 42. As the motors 42 drive the belts 40, each of the sprockets 24 are rotated, thus rotating the shafts 22 and the timing devices 16. In this embodiment, the motors can be operated at different speeds so that the operational frequency of the respective engines 10 are different. Additionally, this embodiment allows some of the engines 10 to be operated while the others are not, depending on the operational parameters. Further, the motors 42 can operate at the same speed as each other so as to ensure that the operational frequency of all of the engines 10 is the same.

In an alternative embodiment, all of the sprockets 24 are coupled to the same belt 40. In this embodiment, all of the timing devices 16 are rotated at the same rate. It is also contemplated that the sprockets 24 can be made of various sizes so as to adjust the rotation rates of the respective timing devices. Namely, by using sprockets 24 of different sizes the respective rotational rates of the timing devices will be different even though the motor 42 is providing a constant speed.

In a further alternative embodiment, at least one of the motors 42 is a variable speed motor, which allows the rotational speed of the timing devices 16 (driven by that motor) to be adjusted based on the operational requirements and parameters.

Additionally it is noted that although this embodiment is shown with two motors 42, it is contemplated that more than two motors 42 can be used, such that the motor to engine ratio is less than that shown in FIG. 4.

In a further alternative to the present invention, each of the respective engines 10 is coupled to its own individual motor 42 and belt 40. In this embodiment, each of the motors 42 can be operated at the same speed, or can be operated at varying speeds so as to provide for asynchronous operation of the engines 10.

Additionally, in this embodiment (as also in the embodiments discussed above) each of the engines 10 may have the same operational frequency (for example 100 Hz) but are configured such that they are not pulsing at the same time. This is accomplished by having the timing devices 16 of respective engines 10 having different starting orientations such that even though they share the same rotational rate as the other engines 10, the engines 10 respective operations (i.e. pulse detonations) are not occurring simultaneously. Further, as with the previous embodiments, the motors 42 may be variable speed motors such that the operation of each respective engine 10 can be varied based on operational characteristics and parameters.

Figure 5:
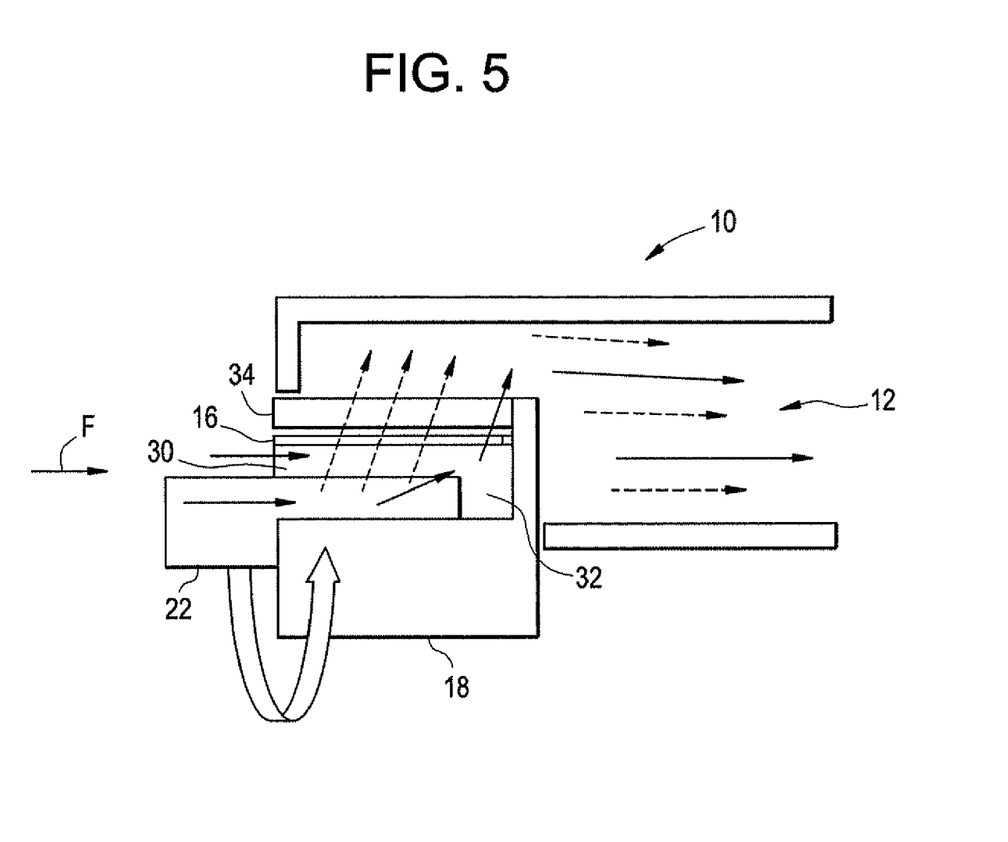
FIG. 5 shows a diagrammatical representation of the embodiment shown in FIG. 1, during operation.

FIG. 5 depicts a cross-section of an engine 10 in accordance with the embodiment of the present invention discussed with regard to FIGS. 1 through 4. As shown in this figure, the stator device 18 and timing device 16 are positioned off-center with respect to the centerline of the engine 10 and the detonation chamber 12. This is done to allow for the efficient flow of air from the stator and timing devices into the chamber 12 based on the configuration of the devices shown in FIGS. 2 and 3. However, the present invention is not limited to this configuration and it is contemplated that additional embodiments of the stator and timing devices can be used which allows for similar operation. For example, it is contemplated that the respective opening portions of the timing and stator devices be on the downstream end wall of each of these components, such that the devices can be positioned on the centerline of the detonation chamber. In any event, the present invention is not limited by the physical structure of the devices or their relative positioning with regard to the detonation chamber.

As shown in FIG. 5, as the shaft 22 rotates the timing device 16 rotates. This allows the open portion 30 of the timing device 16 to communicate with the open portion 32 of the stator device 18 as the rotation occurs. This permits the air flow F to pass from the devices to the detonation chamber 12. Then as the blocking portion 28 of the timing device 16 passes by the opening 32 of the stator device 18, the air flow F is temporarily blocked from entering the detonation chamber.

The size of the respective open portions (30 of the timing device 16, and 32 of the stator device 18) are determined to optimize operation of the engine 10. For example, in an embodiment of the invention, the opening 30 of the timing device 16 should be sufficient to allow the air flow F to sufficiently form an air buffer with any residual post-detonation products within the chamber 12 and refill the chamber 12 with the necessary amount of air flow for the next detonation.

Figure 6:
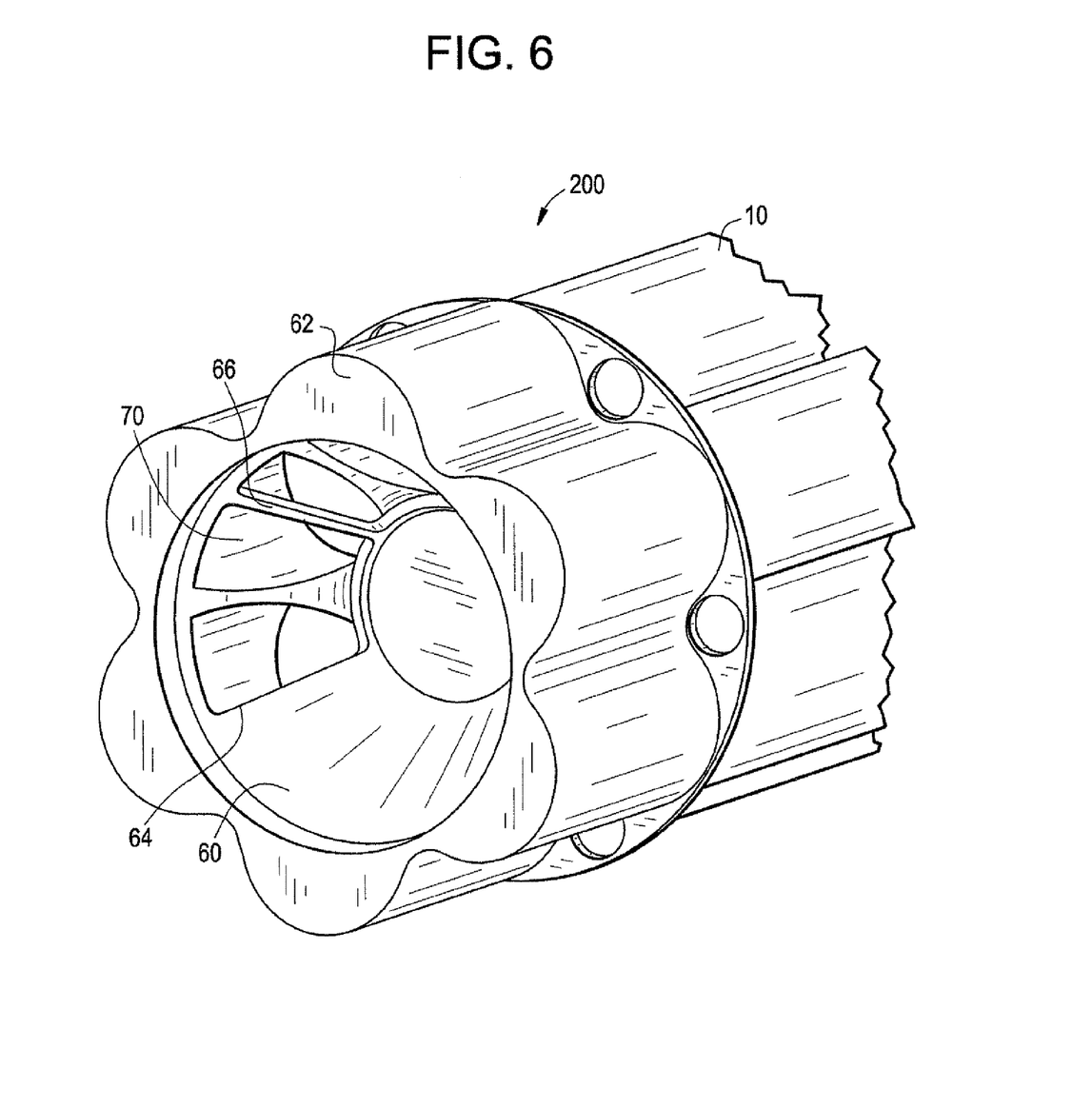
FIG. 6 shows a diagrammatical representation of a plurality of pulse detonation engines and a valve control timing device in accordance with an additional embodiment of the present invention.
Figure 7:
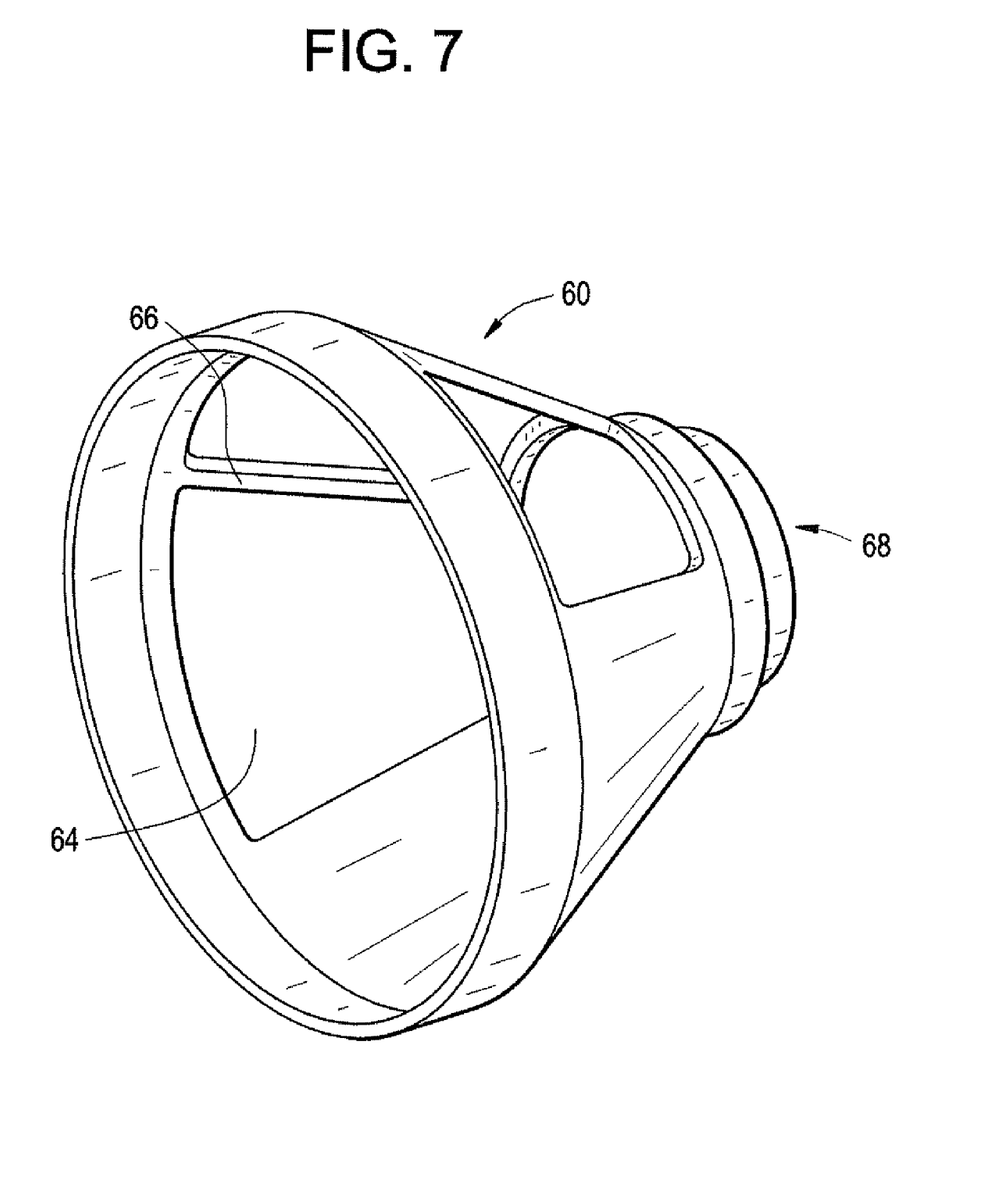
FIG. 7 shows a diagrammatical representation of a valve timing device in accordance with the embodiment shown in FIG. 6.
Figure 8:
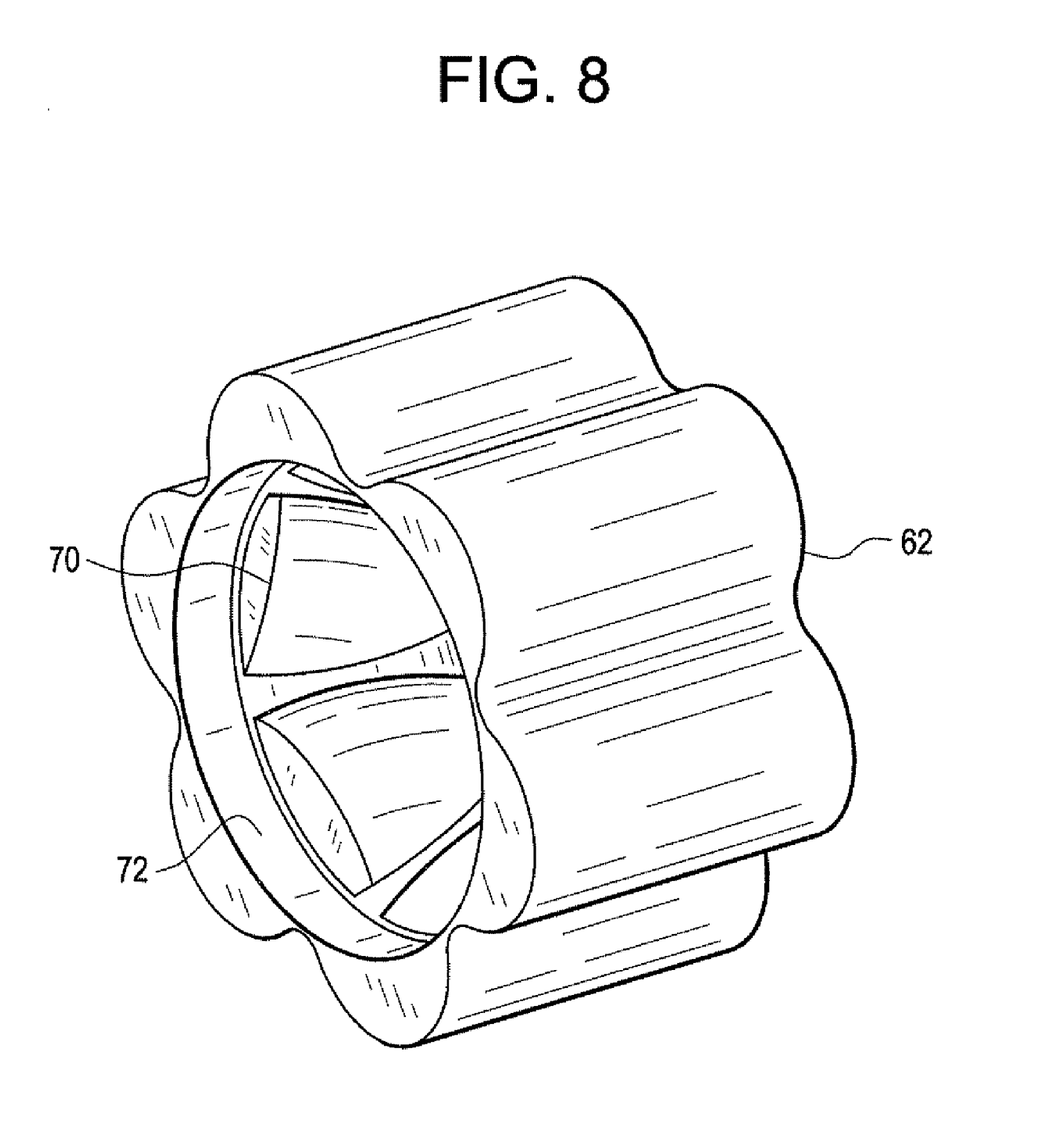
FIG. 8 shows a diagrammatical representation of a stator device in accordance with the embodiment shown in FIG. 6.

Turning now to FIGS. 6, 7 and 8, an additional exemplary embodiment of the present invention is shown. As with FIG. 1, the assembly 200 includes a plurality of pulse detonation engines 10 which are configured in a similar fashion to that described with regard to FIG. 1. Because their respective structure is similar, a detailed discussion of the engines 10 will not be repeated at this point. In this embodiment, a single valve timing device 60 and a single stator device 62 are used for the plurality of engines 10.

In this embodiment, the stator device 62 is secured to the inlet portion of the engines 10. The present invention is not limited by the means of securing the stator device 62 to the engines. Within the stator device 62 are a plurality of channels 70, which are configured so as to communicate with the respective inlet portions of the engines 10. This ensures that air flow will pass along the channels 70 to the respective engines 10, for engine operation. The shape and geometry of the channels 70 are such that operational efficiency and performance are optimized.

Within an opening 72 of the stator device 62 is a valve timing device 60. The valve timing device 60 rotates about an axis which corresponds to a centerline of the assembly 200. As shown in FIG. 7, the valve timing device 60 has a plurality of openings 64 which allow the air flow to pass through to the channels 70, and ultimately the engines 10, for operation. As shown, the openings 64 are separated by support struts 66, which provide for structural integrity of the device 60. The embodiment shown in FIGS. 6 and 7 has three openings 64 and two support struts 66. However, the present invention is not limited to this embodiment. Namely, an embodiment of the present invention can have a single opening, two openings, or more than three, to provide the necessary air flow to each of the engines 10. Moreover, another embodiment of the present invention has openings which are positioned 180 degrees from each other on the device 60. This embodiment allows for the simultaneous operation of engines 10 which are opposite each other, as the valve timing device 60 rotates.

In FIGS. 6 and 7, the valve timing device 60 is conical in shape. However, the present invention is not limited to this geometry. Further, unlike the embodiment shown in FIGS. 1 to 4, in this embodiment the centerline of the valve timing device 60 and stator device 62 is coincident with the centerline of the assembly 200.

Further, the pulse detonation system may be fueled either upstream, downstream, or from within the valve timing or stator devices.

The valve timing device 60 includes a drive connection portion 68 (FIG. 7). In this embodiment, a motor (not shown) is either coupled directly or via a drive shaft or mechanism to impart rotation on the timing device 60. Again, the motor is a variable speed motor to control the timing of the detonations and operation of the engines. In an alternative embodiment, the valve timing device may be driven by a belt or similar mechanism, as shown in FIG. 4. In this configuration, a flange (or similar structure) may extend from the upstream portion of the valve timing device 60, such that a belt may provide the necessary rotation.

Figure 9:
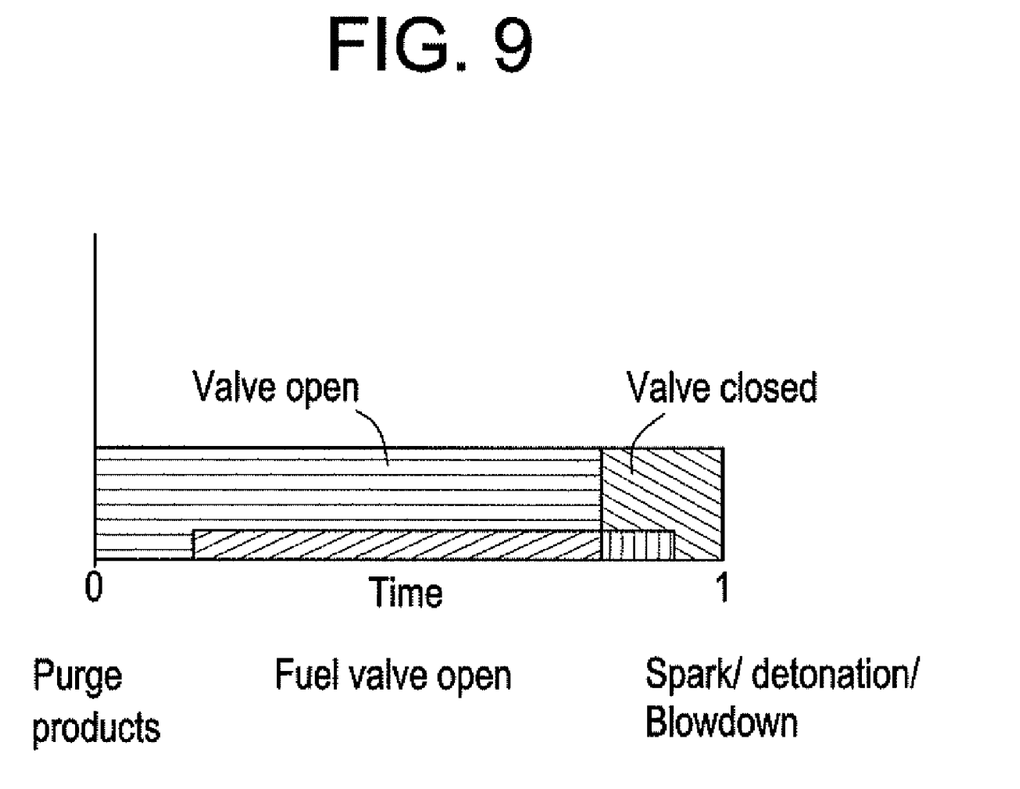
FIG. 9 shows a graphical representation of the timing of air flow through the PDE that is controlled by the components of the present invention as it relates to a single detonation cycle.

A diagrammatical representation of this timing is shown in FIG. 9. For the purposes of simplicity the time is shown from 0 to 1, with no units (i.e. seconds, ms, etc.) The selection of 0 to 1 is intended to merely reflect a single cycle of the device. At time 0 the valve system opens. This is when the opening 30 of the timing device 16 begins communication with the opening 32 of the stator device 18. As these openings communicate with each other, the air flow F begins to purge the detonation chamber 12 of the engine. At some point after T=0, the purge process ends and fuel is injected into the chamber 12 to mix with the air flow F. It is noted that the present invention is not limited in any way with respect to the fuel injection and/or spark initiation methodology used, as any known methods may be used and employed.

At some point after fuel fill begins the blocking portion 28 of the timing device 16 blocks the opening 30 of the stator device 18 and the fuel injection ends. Although it is shown in this figure that the fuel injection ends after the air flow is blocked, the present invention is not limited to this embodiment. Following these events, and when the opening 32 of the stator device 18 is blocked the spark/detonation occurs. Thus, any forward propagating pressure wave is blocked from entering the devices (and going further upstream). Thus damage to any upstream components is avoided.

In the embodiment discussed above, the opening 32 of the stator device 18 is completely blocked by the blocking portion 28 when detonation occurs. However, the present invention is not limited to this embodiment, and it is contemplated that the opening 32 be nearly closed when detonation begins and be fully closed when the main bulk of the forward propagating pressure wave reaches the devices. In any event, the timing of the operation, and the overall sizing of the components are selected to avoid the forward propagation of any significant or appreciable amount of any pressure wave generated from the detonation process. This will protect any upstream components from high pressure waves generated by the pulse detonation process.

It is noted that although the present invention has been discussed above specifically with respect to aircraft applications, the present invention is not limited to this and can be in any similar detonation/deflagration device in which the minimization of forward propagating pressure waves is desired.

While the invention has been described in terms of various specific embodiments, those skilled in the art will recognize that the invention can be practiced with modification within the spirit and scope of the claims.

What is claimed is:

1. A pulse detonation device, comprising:
    a plurality of detonation chambers each having an upstream end having an axis along which a forward-propagating wave moves during operation;
    a stator device coupled to said pulse detonation device, said stator device comprising a plurality of channels, each of said channels having a downstream opening communicating, respectively with said detonation chambers and an upstream opening; and
    a valve timing device having a blocking portion and an opening portion, wherein during operation of said device, each of said blocking portion and said opening portion intermittently communicate with said upstream opening of each of said channels of said stator device, and wherein the communication between the blocking portion of the valve timing device and the upstream opening of each of said channels of the stator device is across an interface whose surface is not substantially normal to the axis of the upstream end of the pulse detonation device.

2. The pulse detonation device of claim 1, wherein said valve timing device rotates about an axis to provide said intermittent communication.

3. The pulse detonation device of claim 1, wherein said valve timing device is supported by a bearing portion concentric with a centerline of said valve timing device.

4. The pulse detonation device of claim 1, wherein each of said valve timing device and said stator device allow flow to enter through a circumferentially disposed side of the pulse detonation device via an interface that is conical, cylindrical, or spline-like in shape.

5. The pulse detonation device of claim 1, wherein said valve timing device is positioned at least partially within said stator device.

6. The pulse detonation device of claim 1, wherein said valve timing device is rotatable with respect to said stator device.

7. The pulse detonation device of claim 1, wherein said valve timing device is coupled to a drive device which drives said valve timing device to provide said intermittent communication.

8. The pulse detonation device of claim 7, wherein said drive device rotates said valve timing device about an axis of said valve timing device.

9. The pulse detonation device of claim 7, wherein said drive device is a variable speed drive device.

10. A pulse detonation system comprising:
    a plurality of pulse detonation devices, wherein each of said pulse detonation devices comprises a detonation chamber having an upstream end having an axis along which a forward-propagating wave moves during operation;
    a stator device coupled to said plurality of detonation devices, said stator device having a channel having a downstream opening communicating, respectively with said detonation chamber and an upstream opening; and
    a valve timing device having a blocking portion and an opening portion, wherein during operation of said devices, each of said blocking portion and said opening portion intermittently communicate with said upstream opening of said stator device, and wherein the communication between the blocking portion of the valve timing device and the upstream opening of the stator device is across an interface whose surface is not substantially normal to the axis of the upstream end of the detonation chamber.

11. The pulse detonation system of claim 10, wherein said valve timing device rotates about an axis to provide said intermittent communication.

12. The pulse detonation system of claim 10, wherein said valve timing device is supported by a bearing portion concentric with a centerline of said valve timing device.

13. The pulse detonation system of claim 10, wherein each of said valve timing device and said stator device allow flow to enter through a circumferentially disposed side of the pulse detonation device via an interface that is conical, cylindrical, or spline-like in shape.

14. The pulse detonation system of claim 10, wherein said valve timing device is positioned at least partially within said stator device.

15. The pulse detonation system of claim 10, wherein said valve timing device is rotatable with respect to said stator device.

16. The pulse detonation system of claim 10, wherein each of said valve timing devices is coupled to at least one drive device which drives said valve timing devices to provide said intermittent communication.

17. The pulse detonation system of claim 16, wherein said at least one drive device rotates said valve timing devices about an axis of the respective valve timing devices.

18. The pulse detonation system of claim 16, wherein said at least one drive device is a variable speed drive device.

19. The pulse detonation system of claim 10, wherein each of said valve timing devices is coupled to a separate drive device, where each of said separate drive devices imparts said intermittent communication for its respective valve timing device.

20. The pulse detonation system of claim 19, wherein at least one of said drive devices is a variable speed drive device.

21. A pulse detonation system; comprising:
    a plurality of pulse detonation devices extending along an axis, each of which comprises a detonation chamber;
    a stator device coupled to said pulse detonation devices, said stator device comprising a plurality of channels, wherein each of said channels is in communication, respectively, with said detonation chambers; and
    a valve timing device having at least one blocking portion and at least one opening portion, wherein during operation of said system, each of said at least one blocking portion and said at least one opening portion intermittently communicates with each of said channels of said stator device across an interface whose surface is not substantially normal to the axis of the plurality of pulse detonation devices.

22. The pulse detonation system of claim 21, wherein said valve timing device rotates about an axis to provide said intermittent communication.

23. The pulse detonation system of claim 21, wherein said valve timing device has a drive connection portion to which a drive device is coupled to rotate said valve timing device.

24. The pulse detonation system of claim 21, wherein each of said valve timing device and said stator device allow flow to enter through a circumferentially disposed side of the pulse detonation device via an interface that is conical, cylindrical, or spline-like in shape.

25. The pulse detonation system of claim 21, wherein said valve timing device is positioned at least partially within said stator device.

26. The pulse detonation system of claim 21, wherein said valve timing device is rotatable with respect to said stator device.

27. The pulse detonation system of claim 21, wherein a centerline of said stator device and valve timing device is positioned on a centerline of said system.

28. The pulse detonation device of claim 21, wherein the valve timing device comprises a plurality of opening portions, at least two of which are separated by a support strut portion.

29. The pulse detonation device of claim 23, wherein said at least one drive device rotates said valve timing device.

30. The pulse detonation device of claim 23, wherein said at least one drive device is a variable speed drive device.

31. The pulse detonation device of claim 1, wherein an inlet to the opening portion is at an angle that is not substantially normal to the axis of the upstream end of the detonation chamber.

32. The pulse detonation system of claim 10, wherein an inlet to the opening portion is at an angle that is not substantially normal to the axis of the upstream end of the detonation chamber.

33. The pulse detonation system of claim 21, wherein an inlet to the opening portion is at an angle that is not substantially normal to the axis of the upstream end of the detonation chamber.

* * * * *

UNITED STATES PATENT AND TRADEMARK OFFICE
CERTIFICATE OF CORRECTION

| | | |
|---|---|---|
| PATENT NO. | : 7,891,164 B2 | Page 1 of 1 |
| APPLICATION NO. | : 11/554824 | |
| DATED | : February 22, 2011 | |
| INVENTOR(S) | : Janssen et al. | |

It is certified that error appears in the above-identified patent and that said Letters Patent is hereby corrected as shown below:

In Column 6, Line 43, delete "time 0" and insert -- time = 0 --, therefor.

In Column 8, Line 53, in Claim 21, delete "system;" and insert -- system, --, therefor.

Signed and Sealed this
Seventeenth Day of May, 2011

David J. Kappos
*Director of the United States Patent and Trademark Office*